United States Patent [19]
Petit

[11] Patent Number: 4,578,012
[45] Date of Patent: Mar. 25, 1986

[54] DEVICE FOR DISCHARGING PULVERULENT PRODUCTS CONTAINED IN A SILO

[75] Inventor: Raymond Petit, Tours, France

[73] Assignee: Guery S.A., Chemille, France

[21] Appl. No.: 576,138

[22] Filed: Feb. 2, 1984

[51] Int. Cl.⁴ .............................................. B65G 65/46
[52] U.S. Cl. ...................................... 414/310; 222/236
[58] Field of Search ....................... 414/306, 310, 327; 222/236, 240

[56] References Cited

U.S. PATENT DOCUMENTS

| | | | |
|---|---|---|---|
| 2,755,942 | 7/1956 | Broberg | 414/306 |
| 3,127,032 | 3/1964 | Roberts | 414/310 |
| 3,513,994 | 5/1970 | De Bower et al. | 414/310 |
| 3,648,860 | 3/1972 | Wennberg | 414/410 |
| 3,766,664 | 10/1973 | Burgin | 414/306 X |

FOREIGN PATENT DOCUMENTS

| | | | |
|---|---|---|---|
| 685333 | 3/1965 | Italy | 414/310 |
| 481822 | 1/1970 | Switzerland | 414/310 |

*Primary Examiner*—Robert J. Spar
*Assistant Examiner*—Stuart J. Millman
*Attorney, Agent, or Firm*—Shenier & O'Connor

[57] ABSTRACT

A device for discharging pulverulent products contained in a cylindrical silo from an appropriate part of the lower periphery of the silo, in which a radial horizontal arm equipped with an Archimedia's screw is placed in the immediate vicinity of the lowest part of the silo and is mounted on a turret, in which there is placed a fixed vertical shaft co-axial with the silo, having a first pinion which cooperates with a second pinion secured to the shaft of the Archimedean screw, and wherein a chain given by a motor is provided to rotate the arm and the turret around the axis of the silo.

3 Claims, 2 Drawing Figures

U.S. Patent    Mar. 25, 1986    4,578,012
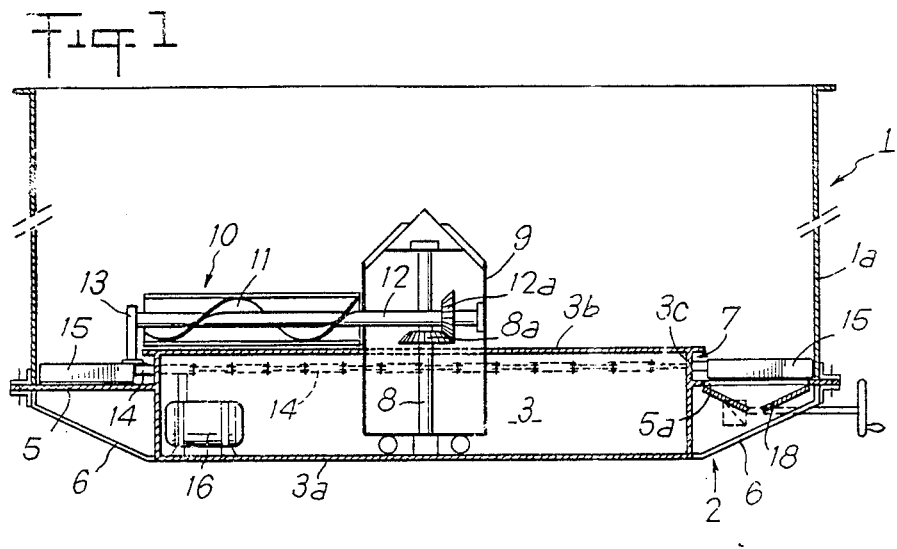
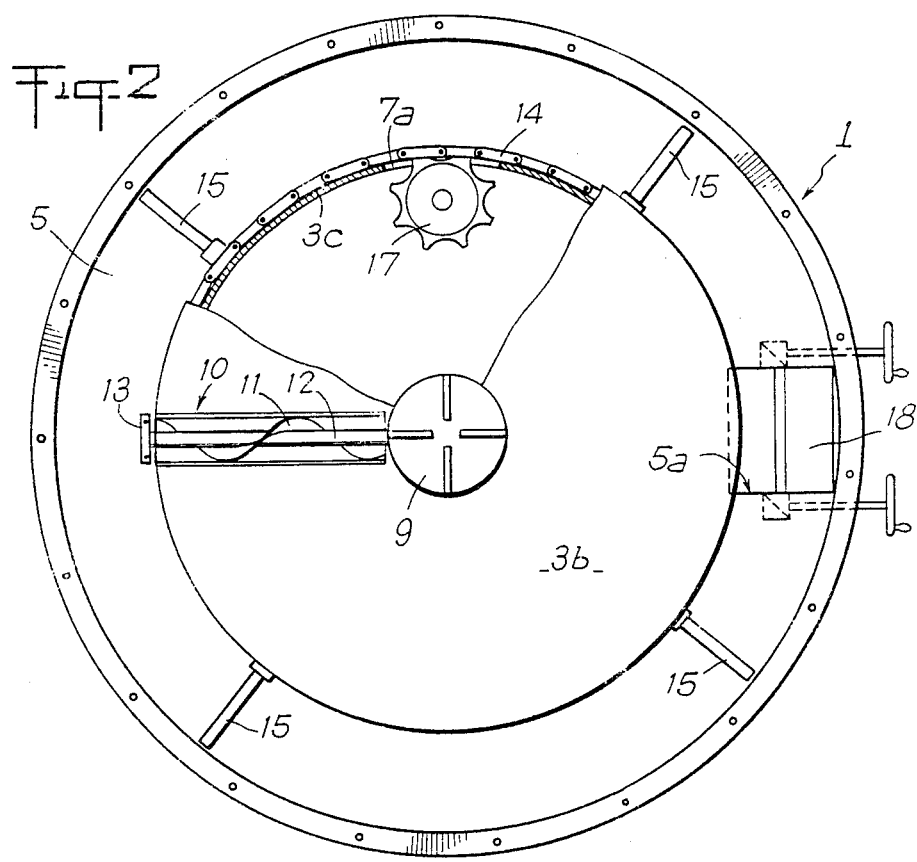

DEVICE FOR DISCHARGING PULVERULENT PRODUCTS CONTAINED IN A SILO

The present invention relates to a device for discharging pulverulent products contained in a silo.

Devices for emptying flat-bottomed silos containing granulated or pulverulent products are already known, particularly from French Pat. Nos. 1 256 579 and 2 449 048. These devices however necessitate some rather important masonry works before they can be used and moreover, they are relatively complex and expensive.

The object of the present invention is to propose a device of the aforesaid type which is adaptable to silos of all types, said device being designed to be just laid and secured on a flat ground. In known manner, a silo-emptying device comprises a radial horizontal arm equipped with an Archimedean screw, said arm being situated in the immediate vicinity of the lowest part of the silo. Said arm is further mounted on a turret whose pivoting axis substantially coincides with the axis of the silo. A fixed vertical shaft, placed inside the turret supports a first pinion which cooperates with a second pinion wedged on the shaft of the Archimedean screw, whereas means are provided to drive the arm and turret in rotation about the axis of the silo.

According to the invention, a cylindrical bin of smaller diameter than the silo, constitutes both the support for the device and the base part of the silo, said bin comprising a flange which extends radially as far as the cylindrical wall of the silo and defines a peripheral groove with the plate projecting at the top of the bin. Said groove is a means of housing an endless chain to which is coupled the outer end of the pivoting arm, and presents an opening in which is situated a sprocket-wheel which cooperate with the chain and is driven by a motor situated inside the bin.

The invention will be more readily understood on reading the following description with reference to the accompanying drawings, in which:

FIG. 1 is a diagrammatical elevational and cross-sectional view of a silo equipped with a discharging device according to the invention.

FIG. 2 is a plan view of the device shown in FIG. 1.

Referring to the drawings, these show a cylindrical silo designated by the general reference 1, placed above a discharging device designated by the general reference 2.

The device support, which is also the bottom part of the silo, is constituted by a cylindrical bin 3 whose base 3a simply rests on a flat ground where it is anchored by any suitable means. The diameter of the bin 3 is smaller than that of the cylindrical wall 1a of the silo and comprises at its upper part and at some distance below upper tray 3b, a flange 5 which extends radially as far as the wall 1a of the silo on which it is fixed by any suitable means.

The outer periphery of flange 5 is joined to the base 3a of the bin via appropriate reinforcing elements preferably open-work elements.

The aforedescribed structure is rigid enough to support the weight of the silo and of any granulated or pulverulent materials contained therein; in addition, the tray 3b projecting at the top of the bin, and the flange 5 define together with the cylindrical wall 3c of the bin, a peripheral groove 7, the function of which is specified hereinafter.

A vertical shaft 8 is fixed on the base 3a of the bin, substantially co-axial to the silo, and acts as a pivot for the discharging device proper, now to be described.

A turret 9 is mounted for pivoting about the shaft 8 said turret actually supporting a radially-fitted horizontal arm 10. Said arm is equipped with an Archimedean screw 11 whose shaft 12 can pivot inside bearings provided on the turret. Arm 8 carries a first pinion 8a which is fixed and meshes with a second pinion 12a wedged on the shaft 12.

The outer end of shaft 12 is mounted for pivoting inside a vertical support 13, which support is fixed on one of the links of an endless chain 14 situated inside groove 7 of the bin 3.

Support and running members are obviously provided to help moving the chain 14 inside the groove 7, this being done in conditions set out hereinafter.

Some of the links of the chain 14 are fitted with blades 15 which are preferably radial and situated in the immediate vicinity of the upper surface of the flange 5. Said flange also presents at least one opening 5a, which can be closed off by an adjustable valve 18 and which is designed to enable the products to flow out of the silo, to be collected and transported by any suitable means.

Finally, a motor 16 is preferably housed inside the bin 3 and its shaft carries a sprocket-wheel 17 which cooperates with the links of chain 14 due to an opening 7a provided in the groove 7.

The device according to the invention works as follows.

The rotation of motor 16 rotates the sprocket-wheel 17 and as a result moves the chain 14 inside its circular housing 7. The support 13 joined to the chain 14 moves horizontal arm 10 which, then, pivots, together with the turret 9, about vertical shaft 8. Due to the cooperation of the two pinions 8a and 12a, the shaft 12 pivots on its axis so that Archimedean screw 11 carries away the products contained in the silo and pours them on to the flange 5. At the same time, the blades 15 scrape the products deposited on the flange and bring them to opening 5a through which they are discharged.

What I claim is:

1. A device for discharging pulverulent products contained in a cylindrical silo, the discharge of said products taking place in an appropriate part of the lower periphery of the silo, said device comprising a radial horizontal arm equipped with an Archimedean screw, said arm being placed in the immediate vicinity of the lowest part of the silo and being mounted on a turret while a fixed vertical shaft is placed inside the turret co-axially with the silo and is provided with a first pinion which cooperates with a second pinion wedged on the shaft of the Archimedean screw, whereas means are provided to drive the arm and turret in rotation about the axis of the silo, wherein a cylindrical bin of diameter smaller than that of the silo and having an upper tray which constitutes both the support for the device and the lowest part of the silo, which bin comprises a flange which extends radially as far as the cylindrical wall of the silo and defines a peripheral groove with said upper tray and wherein said drive means are constituted by an endless chain housed in said groove and coupled to the outer end of the horizontal arm, said groove further presenting an opening in which is placed a sprocket-wheel which cooperates with the chain and is driven by a motor situated inside the bin.

2. A device as claimed in claim 1, wherein the chain is provided with horizontal blades extending radially, situated in the immediate vicinity of the flange of the bin.

3. A device as claimed in claim 2, wherein at least one opening is provided in the flange of the bin, said opening constituting a discharge conduit and being equipped with an adjustable closing off member.

* * * * *